United States Patent
Lee

(10) Patent No.: US 11,994,599 B2
(45) Date of Patent: May 28, 2024

(54) POSITIONING SYSTEM AND POSITIONING METHOD

(71) Applicant: Coretronic Corporation, Hsin-Chu (TW)

(72) Inventor: Jhao-Hong Lee, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 401 days.

(21) Appl. No.: 17/380,024

(22) Filed: Jul. 20, 2021

(65) Prior Publication Data

US 2022/0026584 A1 Jan. 27, 2022

(30) Foreign Application Priority Data

Jul. 23, 2020 (TW) ................................. 109124874

(51) Int. Cl.
*G01S 19/43* (2010.01)
*G01S 19/47* (2010.01)

(52) U.S. Cl.
CPC .............. *G01S 19/43* (2013.01); *G01S 19/47* (2013.01)

(58) Field of Classification Search
CPC .................................. G01S 19/43; G01S 19/47
See application file for complete search history.

(56) References Cited

U.S. PATENT DOCUMENTS

| | | |
|---|---|---|
| 8,983,685 B2 | 3/2015 | Dai et al. |
| 2007/0075896 A1* | 4/2007 | Whitehead .............. G01S 19/53 |
| | | 342/357.36 |
| 2010/0214161 A1 | 8/2010 | Talbot et al. |
| 2014/0324291 A1* | 10/2014 | Jones ...................... G01S 19/41 |
| | | 701/41 |
| 2016/0334804 A1 | 11/2016 | Webber et al. |

FOREIGN PATENT DOCUMENTS

| | | | | |
|---|---|---|---|---|
| CN | 101907467 | | 12/2010 | |
| CN | 102012625 | | 4/2011 | |
| CN | 102455182 | | 5/2012 | |
| CN | 102761961 | | 10/2012 | |
| CN | 105358769 | | 2/2016 | |
| CN | 106941395 | | 7/2017 | |
| CN | 107092027 A | * | 8/2017 | ............. G01S 19/54 |
| CN | 108594281 | | 9/2018 | |
| TW | 200615564 | | 5/2006 | |

* cited by examiner

*Primary Examiner* — Bernarr E Gregory
*Assistant Examiner* — Fred H Mull
(74) *Attorney, Agent, or Firm* — JCIPRNET

(57) ABSTRACT

A positioning system and a positioning method are provided. The method includes: receiving, via a movable base station (MBS) disposed on a vehicle, radio data at a first time point; performing RTK calculation according to the radio data to obtain a rover position of a second time point; obtaining an attitude angle variation of a rover between the first time point and the second time point; calculating an MBS position of the second time point according to the rover position of the second time point and the attitude angle variation; positioning the vehicle of the second time point according to the MBS position and the rover position of the second time point; and calculating a carrier phase difference between the MBS and the rover at the second time point to update the radio data at the second time point.

12 Claims, 4 Drawing Sheets

POSITIONING SYSTEM AND POSITIONING METHOD

CROSS-REFERENCE TO RELATED APPLICATION

This application claims the priority benefit of Taiwan application serial no. 109124874, filed on Jul. 23, 2020. The entirety of the above-mentioned patent application is hereby incorporated by reference herein and made a part of this specification.

BACKGROUND OF THE INVENTION

Field of the Invention

The invention relates to a system method, and particularly relates to a positioning system and a positioning method.

Description of Related Art

At present, global positioning system (GPS) techniques have been widely used in many different products such as car navigation systems, aviation navigation systems, or map surveying software. These products all require very precise positioning techniques. Among a variety of existing techniques, real-time kinematic (RTK) techniques may provide precise positioning at the centimeter level. RTK techniques may be based on parameters such as signal encoding content, signal encoding time difference, and carrier phase difference of the radio technical commission for maritime (RTCM) data transmitted from a fixed base station to a rover to calculate the absolute position of the fixed base station by a difference operation, and the relative positions of the fixed base station and the rover may be calculated based on parameters such as signal encoding time difference and carrier phase difference.

When the position of the rover is tracked using RTK techniques, the fixed base station needs to continuously correct atmospheric errors to achieve real-time accurate positioning. If the range of movement of the rover is too large such that the atmospheric error is changed, the accuracy of the RTK techniques is reduced. Therefore, RTK techniques are more suitable for tracking objects within a specific range. In addition, the communication between the fixed base station and the rover relies on high-power radio frequency signals. Poor signal quality of the radio frequency signal reduces the accuracy of RTK techniques. Moreover, an excessively strong radio frequency signal may also easily cause adverse effects on electronic products or personnel around the fixed base station. Furthermore, when using RTK techniques for positioning, the fixed base station needs to spend a period of time to demodulate RTCM data. Therefore, when the position of the rover is constantly changing, the fixed base station with limited computing power is often unable to estimate the correct position of the rover in real time according to the RTK techniques.

Accordingly, how to provide improved RTK techniques so that the position information may be estimated in real time is one of the objects of those in the art.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention provides a positioning system and a positioning method that may update the positions of a movable base station and a rover in real time, thereby positioning a vehicle according to updated movable base station and rover position data.

A positioning system of the invention is suitable for positioning a vehicle and includes a rover, a movable base station, and a processor. The rover is disposed on the vehicle and located at a rover position of a first time point. The movable base station is disposed on the vehicle, located at a movable base station position of the first time point, and receives a radio data at the first time point. The processor is coupled to the movable base station and the rover, wherein when the vehicle is moved at a second time point, the processor is configured to perform a real-time kinematic calculation according to the radio data to obtain the rover position of the second time point, obtain an attitude angle variation of the rover between the first time point and the second time point, calculate the movable base station position of the second time point according to the rover position of the second time point and the attitude angle variation, position the vehicle of the second time point according to the movable base station position and the rover position of the second time point, and calculate a carrier phase difference between the movable base station and the rover at the second time point to update the radio data at the second time point.

In an embodiment of the invention, the positioning system further includes an orientation estimator. The orientation estimator is coupled to the processor and configured to measure the attitude angle variation.

In an embodiment of the invention, the radio data corresponds to at least one of the following: a distance between a satellite and the movable base station, an ionospheric error, a tropospheric error, a carrier frequency, a carrier wavelength, a carrier phase, a number of carriers between the rover and the satellite, an error of a code phase measurement, and an error of a carrier phase measurement.

In an embodiment of the invention, the distance between the satellite and the movable base station includes the code phase measurement and the carrier phase measurement.

In an embodiment of the invention, the processor calculates the carrier phase difference according to the distance between the movable base station and the rover and an elevation angle corresponding to the satellite and the movable base station.

In an embodiment of the invention, the orientation estimator includes at least one of the following: a three-axis gyroscope, a three-axis accelerometer, and a three-axis electronic compass.

A positioning method of the invention is suitable for positioning a vehicle, wherein a movable base station and a rover are disposed on the vehicle. The positioning method includes: receiving, via a movable base station (MBS) disposed on a vehicle, a radio data at a first time point, wherein the movable base station is located at a movable base station position at the first time point, and the rover is located at a rover position at the first time point; performing a real-time kinematic calculation according to the radio data via a processor when the vehicle is moved at a second time point to obtain the rover position of the second time point; obtaining an attitude angle variation of the rover between the first time point and the second time point; calculating an MBS position of the second time point according to the rover position of the second time point and the attitude angle variation; positioning the vehicle of the second time point according to the MBS position and the rover position of the second time point; and calculating a carrier phase difference between the MBS and the rover at the second time point to update the radio data at the second time point.

In an embodiment of the invention, the positioning method further includes: obtaining an attitude angle variation via an orientation estimator.

In an embodiment of the invention, the radio data corresponds to at least one of the following: a distance between a satellite and the movable base station, an ionospheric error, a tropospheric error, a carrier frequency, a carrier wavelength, a carrier phase, a number of carriers between the rover and the satellite, an error of a code phase measurement, and an error of a carrier phase measurement.

In an embodiment of the invention, the distance between the satellite and the movable base station includes the code phase measurement and the carrier phase measurement.

In an embodiment of the invention, the step of calculating the carrier phase difference between the movable base station and the rover at the second time point to update the radio data of the second time point includes: calculating the carrier phase difference according to the distance between the movable base station and the rover and the elevation angle corresponding to the satellite and the movable base station.

In an embodiment of the invention, the orientation estimator includes at least one of the following: a three-axis gyroscope, a three-axis accelerometer, and a three-axis electronic compass.

Based on the above, the positioning system and the positioning method of the invention may be configured to position a vehicle having a wide range of movement. The positioning system may update the radio data in real time according to the measured attitude angle, thereby positioning the vehicle. In this way, the positioning system may achieve good positioning accuracy in a shorter time and with less computing power.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
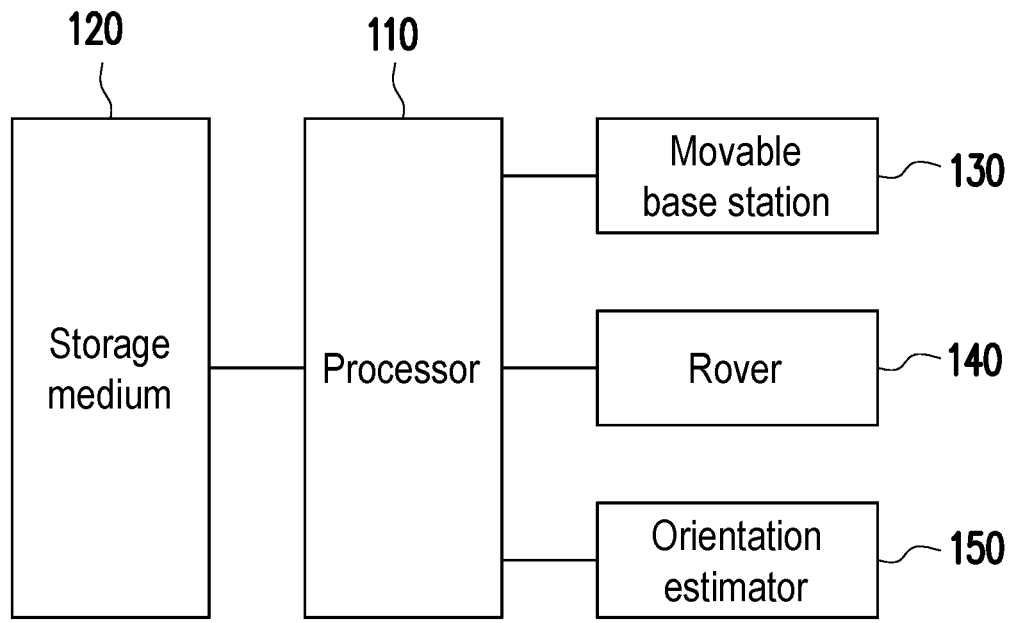
FIG. 1 is a diagram of a positioning system suitable for positioning a vehicle shown according to an embodiment of the invention.

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

To make the contents of the invention more easily understood, embodiments are provided below as examples of the plausibility of implementation of the invention. Moreover, when applicable, devices/components/steps having the same reference numerals in figures and embodiments represent the same or similar parts.

In order to instantly position a vehicle having a wide range of movement, the invention provides a positioning system and a positioning method to improve the accuracy of positioning a vehicle by a real-time positioning technique.

Figure 2A:
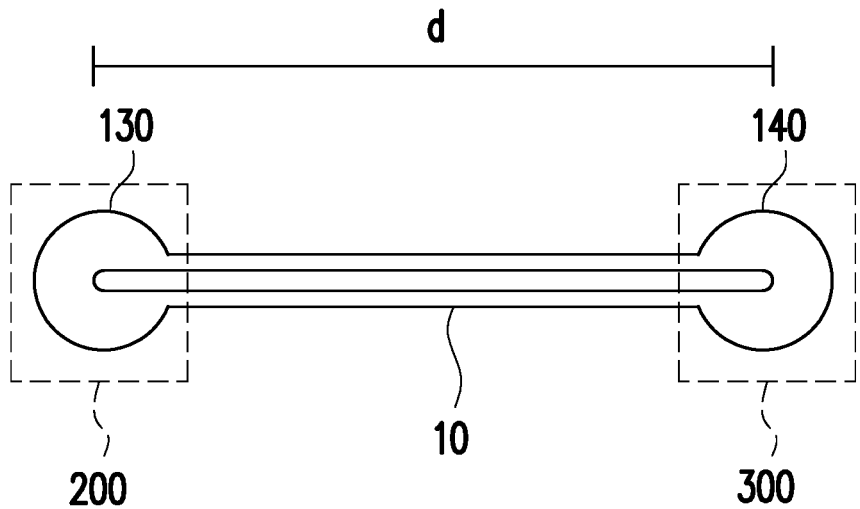
FIG. 2A is a diagram of a movable base station and a rover at a first time point shown according to an embodiment of the invention.
Figure 2B:
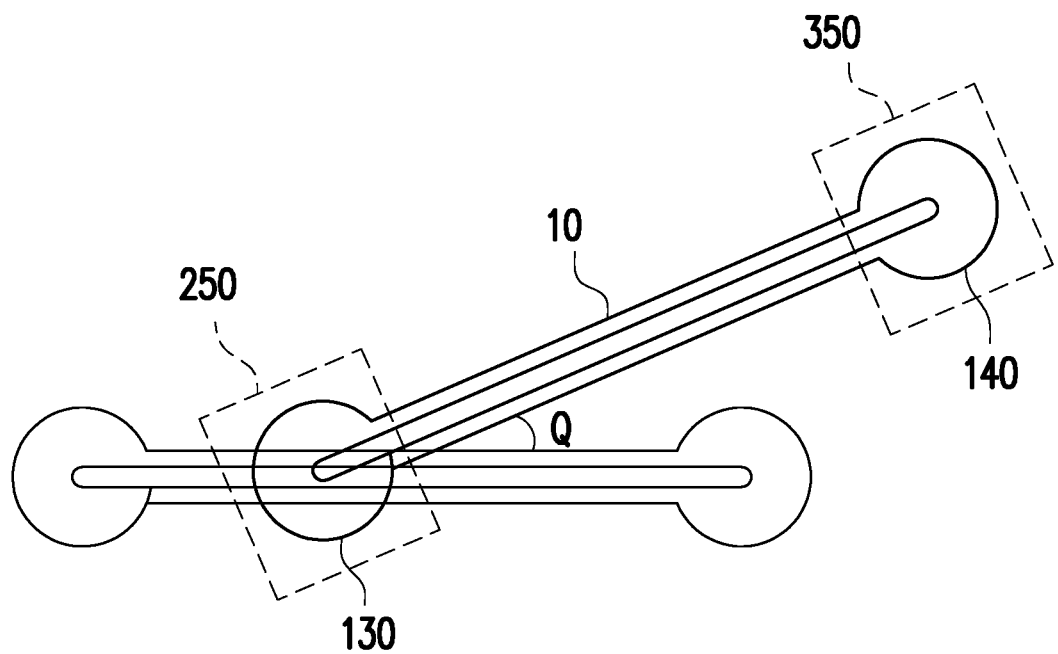
FIG. 2B is a diagram of a movable base station and a rover at a second time point shown according to an embodiment of the invention.

FIG. 1 is a diagram of a positioning system 100 suitable for positioning a carrier shown according to an embodiment of the invention. The positioning system 100 may include a processor 110, a storage medium 120, a movable base station (MBS) 130, a rover 140, and an orientation estimator 150. The positioning system 100 may be, for example, disposed on the vehicle 10 as shown in FIG. 2A or 2B to position the vehicle 10.

The processor 110 is, for example, a central processing unit (CPU), or other programmable general-purpose or special-purpose micro control units (MCU), microprocessors, digital signal processors (DSP), programmable controllers, application-specific integrated circuits (ASIC), graphics processing units (GPU), image signal processors (ISP), image processing units (IPU), arithmetic logic units (ALU), complex programmable logic devices (CPLD), field-programmable gate arrays (FPGA), or other similar components or a combination of the above components. The processor 110 may be coupled/electrically connected to the storage medium 120, the movable base station 130, the rover 140, and the orientation estimator 150, and access and execute various modules and applications stored in the storage medium 120.

The storage medium 120 is, for example, any type of fixed or removable random-access memory (RAM), read-only memory (ROM), or flash memory, hard disk drive (HDD), solid-state drive (SSD), or similar components or a combination of the above components configured to store a plurality of modules or various applications that may be executed by the processor 110.

Figure 3:
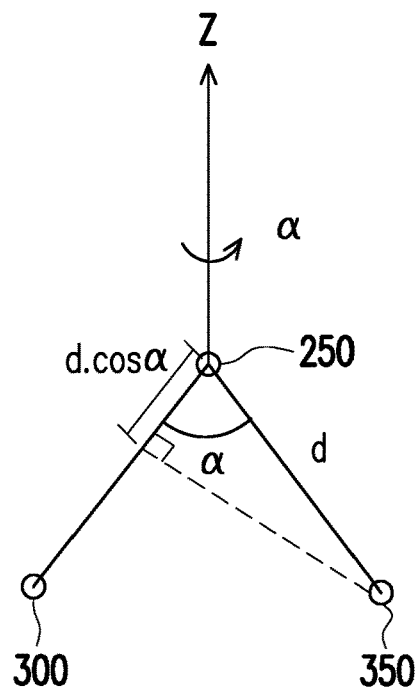
FIG. 3 is a diagram of calculating a movable base station position according to a rover position and an attitude angle variation shown according to an embodiment of the invention.

The movable base station 130 or the rover 140 is, for example, an advanced base station (ABS), a base transceiver system (BTS), an access point, a home base station, a relay station, a scatter, a repeater, an intermediate node, or an intermediary/satellite-based communication base station. The movable base station 130 and the rover 140 may be respectively disposed at different positions of the vehicle 10, and may transmit or receive signals in a wireless or wired manner. Specifically, the movable base station 130 or the rover 140 may receive radio data in a wireless manner, wherein the radio data is, for example, RTCM data. In an embodiment, the movable base station 130 receives radio data from a satellite and transmits it to the rover 140. In an embodiment, the movable base station 130 or the rover 140 may also be configured to receive a positioning signal such as a GPS signal. The positioning signal may include an elevation angle corresponding to a satellite 20 and the movable base station 130 as shown in FIG. 3, wherein the elevation angle is, for example, an angle formed by the horizontal plane of the position where the movable base station 130 is located and the straight line from the position to the satellite 20.

The orientation estimator 150 includes, for example, a three-axis gyroscope, a three-axis accelerometer, or a three-axis electronic compass. The orientation estimator 150 may be configured to measure the attitude angle variation of the movable base station 130 (or the rover 140) over a period of time. In an embodiment, the orientation estimator 150 may also be configured to receive a positioning signal such as a GPS signal. For example, the orientation estimator 150 may also include a positioning device such as a GPS receiver for receiving a positioning signal. The positioning signal may include an elevation angle corresponding to the satellite 20 and the movable base station 130 as shown in FIG. 3, wherein the elevation angle is, for example, an angle formed by the horizontal plane of the position where the movable base station 130 is located and the straight line from the position to the satellite 20.

FIG. 2A is a diagram of the movable base station 130 and the rover 140 at a first time point shown according to an embodiment of the invention. In the present embodiment, it is assumed that the movable base station 130 is located at a position 200 at the first time point, and the rover 140 is located at a position 300 at the first time point. The movable base station 130 may receive a radio data at the first time point and forward the radio data to the rover 140. The processor 110 may demodulate the radio data received by the movable base station 130 and the forwarded radio data received by the rover 140. After continuously receiving and demodulating the radio data and the forwarded radio data for a period of time, the processor 110 may calculate various parameters based on a difference operation, wherein the parameters may include the distance between the satellite 20 and the movable base station 130, the distance between the satellite 20 and the rover 140, the ionospheric error at the position of the vehicle 10, the tropospheric error at the position of the vehicle 10, the carrier frequency of the radio data, the carrier wavelength of the radio data, the carrier phase of the radio data, the number of carriers between the rover 140 and the satellite 20, the noise of code phase measurement, or the noise of carrier phase measurement, etc., and the invention is not limited thereto.

The distance between the satellite 20 and the movable base station 130 may include a code phase measurement $P_1$ as shown in equation (1) and a carrier phase measurement $\Phi_1$ as shown in equation (2), wherein $\lambda$ is carrier wavelength of radio data, N is undecided number of integer carriers between the movable base station 130 and the satellite 20, $\rho$ is distance between the satellite 20 and the movable base station 130, f is carrier frequency of radio data, $$\frac{1}{f^2}$$

is ionospheric error, T is tropospheric error, c is speed of light, $\Delta t$ is transmission time of radio data from the satellite 20 to the movable base station 130, $\varepsilon_P$ is error of code phase measurement $P_1$, $\varepsilon_\Phi$ is error of carrier phase measurement $\Phi_1$, and $\Delta\varphi$ is carrier phase difference between the movable base station 130 and the rover 140.

$$P_1 = \rho + \frac{1}{f^2} + T + c \cdot \Delta t + \varepsilon_P \tag{1}$$

$$\Phi_1 = \lambda \cdot N + \rho - \frac{1}{f^2} + T + c \cdot \Delta t + \varepsilon_\Phi \tag{2}$$

After the distance between the satellite 20 and the movable base station 130 (that is, the code phase measurement $P_1$ and the carrier phase measurement $\Phi_1$) is obtained, the processor 110 may calculate the absolute coordinates of the movable base station 130 at the first time point (i.e., the absolute coordinates of the position 200) according to the distance between the satellite 20 and the movable base station 130, wherein the absolute coordinates may be presented in the form of geodetic coordinates, spherical coordinates, earth centered, earth fixed (ECEF) coordinates, or local tangent plane coordinates, but the invention is not limited thereto. In a similar manner, the processor 110 may obtain the distance between the satellite 20 and the rover 140 (i.e., the code phase measurement and the carrier phase measurement), and calculate the absolute coordinates of the rover 140 at the first time point (i.e., the absolute coordinates of the position 300) according to the distance between the satellite 20 and the rover 140.

The processor 110 may determine the position of the vehicle 10 at the first time point according to the absolute coordinates of the movable base station 130 at the first time point and the absolute coordinates of the rover 140 at the first time point.

FIG. 2B is a diagram of the movable base station 130 and the rover 140 at a second time point shown according to an embodiment of the invention. In the present embodiment, it is assumed that after the vehicle 10 is moved at the second time point, the position of the movable base station 130 is moved from the position 200 of the first time point to a position 250 of the second time point, and the position of the rover 140 is moved from the position 300 of the first time point to a position 350 of the second time point.

In response to this, the invention provides a method of instantly updating the positions of the movable base station 130 and the rover 140 at the second time point using RTK calculation and attitude angle variation. First, after the vehicle 10 is moved at the second time point, the processor 110 may perform RTK calculation according to radio data to obtain the rover position of the rover 140 at the second time point.

The processor 110 may measure an attitude angle variation Q of the rover 140 between the first time point and the second time point via the orientation estimator 150. In an embodiment, the attitude angle variation Q is represented by a quaternion $(w_0, x_0, y_0, z_0)$. In an embodiment, the attitude angle variation Q is represented by Euler angle $(\alpha, \beta, \gamma)$. The quaternion and the Euler angle may be converted to each other according to the following equations (3), (4), and (5), wherein $\alpha$ is the yaw rotating counterclockwise along the z-axis, $\beta$ is the pitch rotating counterclockwise along the y-axis, and $\gamma$ is the roll rotating counterclockwise along the x-axis.

$$\alpha = \tan^{-1}\left(\frac{2(x_0 y_0 - w_0 z_0)}{w_0^2 + x_0^2 - y_0^2 - z_0^2}\right) \tag{3}$$

$$\beta = \sin^{-1}(-2(w_0 y_0 + x_0 z_0)) \tag{4}$$

$$\gamma = \tan^{-1}\left(\frac{2(y_0 z_0 - w_0 x_0)}{w_0^2 - x_0^2 - y_0^2 + z_0^2}\right) \tag{5}$$

The processor 110 may calculate the movable base station position of the movable base station 130 at the second time point (i.e., the position 250) according to the rover position of the rover 140 at the second time point (i.e., the position 350) and the attitude angle variation Q.

Assuming that the coordinates of the position 350 of the rover 140 at the second time point are $(x_1, y_1, z_1)$ and the coordinates of the position 250 of the movable base station 130 at the second time point are $(x_2, y_2, z_2)$, the processor 110 may determine an x-axis relative coordinate value $x_2$ of the position 250 (i.e., the position of the movable base station 130 at the second time point) according to a distance d between the movable base station 130 and the rover 140, the coordinates of the position 350, and an Euler angle $\alpha$, as shown in FIG. 3. FIG. 3 is a diagram of calculating the movable base station position (that is, the position 250) according to the rover position (that is, the position 350) and the Euler angle $\alpha$ shown according to an embodiment of the invention. The processor 110 may calculate the x-axis relative coordinate value $x_2$ of the position 250 according to the following equation (6).

$$x_2 = x_1 - d \cdot \cos \alpha \tag{6}$$

Based on a similar manner to the x coordinate axis, the processor 110 may calculate a y-axis relative coordinate value $y_2$ of the position 250 and an x-axis relative coordinate value $z_2$ of the position 250 according to the following equations (7) and (8).

$$y_2 = y_1 - d \cdot \cos \beta \tag{7}$$

$$z_2 = z_1 - d \cdot \cos \gamma \tag{8}$$

After calculating the movable base station position of the movable base station 130 at the second time point and the rover position of the rover 140 at the second time point, the processor 110 may position the vehicle 10 at the second time point according to the movable base station position and the rover position.

Figure 4:
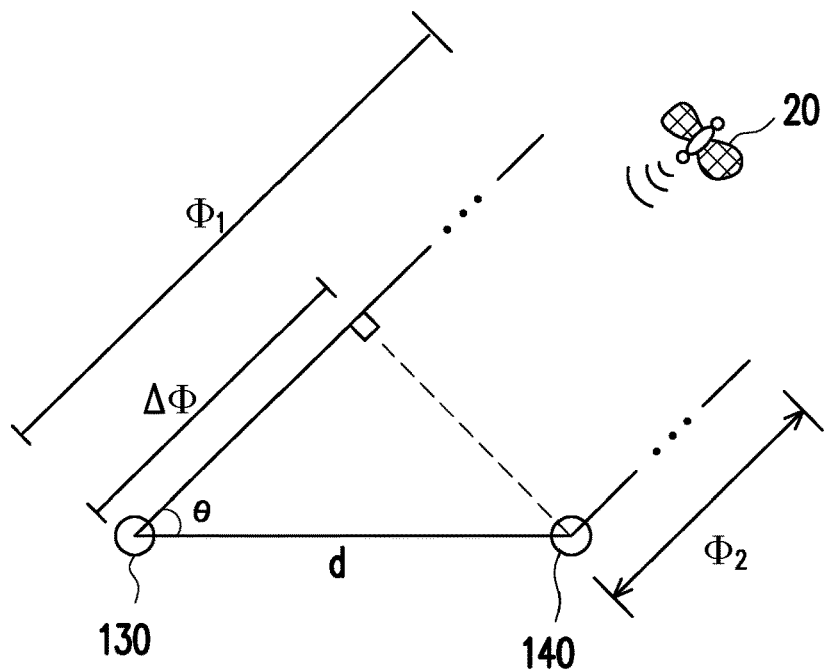
FIG. 4 is a diagram of a carrier phase measurement difference between a movable base station and a rover shown according to an embodiment of the invention.

FIG. 4 is a diagram of a carrier phase measurement difference $\Delta\Phi$ between the movable base station 130 and the rover 140 shown according to an embodiment of the invention, wherein $\Phi_1$ represents the carrier phase measurement between the satellite 20 and the movable base station 130, $\Phi_2$ represents the carrier phase measurement between the satellite 20 and the rover 140, $\Delta\Phi$ represents the carrier phase measurement difference ($\Delta\Phi = \Phi_1 - \Phi_1$) between the movable base station 130 and the rover 140, d represents the distance between the movable base station 130 and the rover 140, and $\theta$ represents the elevation angle corresponding to the satellite 20 and the movable base station 130 (or the rover 140). The elevation angle $\theta$ may be derived from the positioning signal received by the movable base station 130, the rover 140, or the orientation estimator 150, wherein the positioning signal is, for example, a GPS signal. The processor 110 may calculate a carrier phase difference $\Delta\varphi$ according to the distance d between the movable base station 130 and the rover 140 and the elevation angle $\theta$ corresponding to the satellite 20 and the movable base station 130, or calculate the carrier phase difference $\Delta\varphi$ according to the carrier phase measurement difference $\Delta\theta$ between the movable base station 130 and the rover 140, as shown in equation (9). In an embodiment, an integer carrier undetermined number N may be equal to zero. For example, when $\lambda$ is equal to 19 cm and the frequency of the radio signal received by the movable base station 130 is 1575 MHz and d is less than 19 cm, the integer carrier undetermined number N may be equal to zero.

$$\Delta\varphi = \Delta\Phi - \lambda \cdot N = d \cdot \cos\theta - \lambda \cdot N \tag{9}$$

After the carrier phase difference $\Delta\varphi$ corresponding to the second time point is calculated, the processor 110 may update the radio data of the second time point according to the carrier phase difference $\Delta\varphi$ to calculate the position of the rover 140 next time (for example, the third time point), and the update method of the invention is not limited thereto. In an embodiment, the method of updating radio data may be to update the radio data by using the ECEF of the movable base station 130, such as updating the Stationary RTK Reference Station ARP of No. 1005 data field in RTCM 3.0 data. After the data field of No. 1005 is updated, the radio data sent to the rover 140 next time is the latest positioning data of the movable base station 130, the positioning step for subsequent RTK calculation may be performed, and the update positioning step is similar to the above and is not repeated herein.

In this way, the position of the rover 140 at the current time point is calculated using the position information of the movable base station 130 at the previous time point and the radio data, and then the position of the movable base station 130 at the current time point is calculated via the position of the rover 140 of the current time point, such that the position of the vehicle 10 of the current time point may be located.

Figure 5:
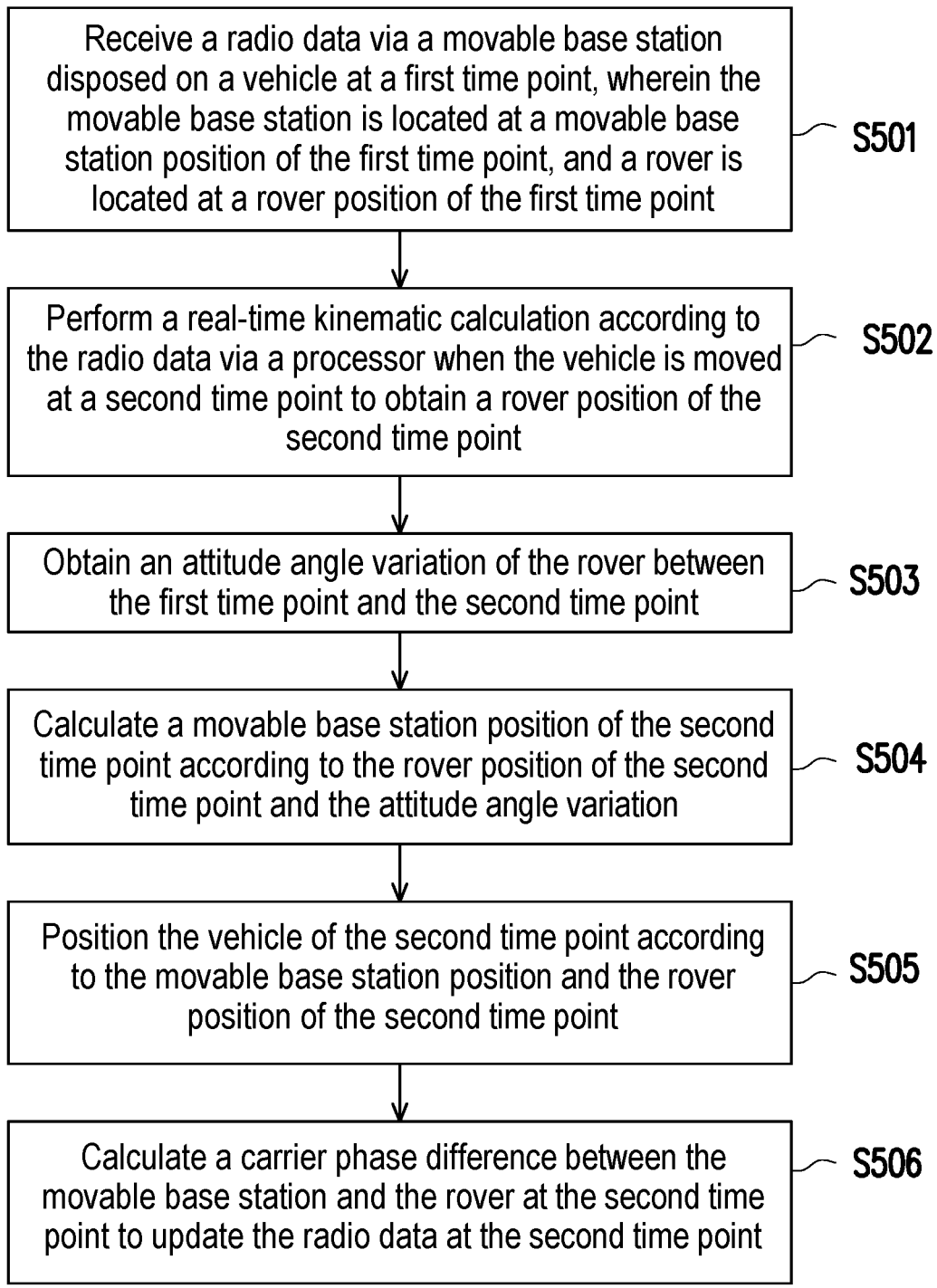
FIG. 5 is a diagram of a positioning method suitable for positioning a vehicle shown according to an embodiment of the invention.

FIG. 5 is a diagram of a positioning method suitable for positioning a vehicle shown according to an embodiment of the invention, wherein the positioning method may be implemented by the positioning system 100 shown in FIG. 1. In step S501, a radio data is received via a movable base station disposed on a vehicle at a first time point, wherein the movable base station is located at a movable base station position at the first time point, and a rover is located at a rover position at the first time point. In step S502, a real-time kinematic calculation is performed according to the radio data via a processor when the vehicle is moved at a second time point to obtain the rover position of the second time point. In step S503, an attitude angle variation of the rover between the first time point and the second time point is obtained. In step S504, the movable base station position at the second time point is calculated according to the rover position of the second time point and the attitude angle variation. In step S505, the vehicle at the second time point is positioned according to the movable base station position of the second time point and the rover position. In step S506, a carrier phase difference between the movable base station and the rover at the second time point is calculated to update the radio data at the second time point.

Based on the above, the positioning system and the positioning method of the invention may be configured to position a vehicle having a wide range of movement. The rover position is calculated via the radio data between the movable base station and the rover. The positioning system may further measure the attitude angle variation of the rover via the orientation estimator to calculate the movable base station position using the attitude angle variation, and update the radio data via the carrier phase difference between the movable base station and the rover. Therefore, the positioning system only needs to demodulate the initial radio data to obtain updated radio data, and perform positioning of the vehicle at different time points according to the updated radio data to achieve good positioning accuracy. Moreover, the positioning system of the invention does not require a fixed base station, thus having the advantage of not being restricted by distance and terrain. The modularized positioning system may be disposed on any type of vehicle to position the vehicle.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may adopt the use of "first", "second", etc., followed by a noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A positioning system suitable for positioning a vehicle, comprising:
    a rover disposed on the vehicle and located at a rover position of a first time point;
    a movable base station disposed on the vehicle, located at a movable base station position of the first time point, and receiving a radio data at the first time point; and
    a processor coupled to the movable base station and the rover, wherein when the vehicle is moved at a second time point, the processor is configured to perform a real-time kinematic calculation according to the radio data to obtain the rover position of the second time point, obtain an attitude angle variation of the rover between the first time point and the second time point, calculate the movable base station position of the second time point according to the rover position of the second time point and the attitude angle variation, position the vehicle of the second time point according to the movable base station position and the rover position of the second time point, and calculate a carrier phase difference between the movable base station and the rover at the second time point to update the radio data at the second time point.

2. The positioning system of claim 1, further comprising:
    an orientation estimator coupled to the processor and configured to measure the attitude angle variation.

3. The positioning system of claim 2, wherein the orientation estimator comprises at least one of the following: a three-axis gyroscope, a three-axis accelerometer, and a three-axis electronic compass.

4. The positioning system of claim 1, wherein the radio data corresponds to at least one of the following: a distance between a satellite and the movable base station, an ionospheric error, a tropospheric error, a carrier frequency, a carrier wavelength, a carrier phase, a number of carriers between the rover and the satellite, an error of a code phase measurement, and an error of a carrier phase measurement.

5. The positioning system of claim 4, wherein the distance between the satellite and the movable base station comprises the code phase measurement and the carrier phase measurement.

6. The positioning system of claim 4, wherein the processor calculates the carrier phase difference according to a distance between the movable base station and the rover and an elevation angle corresponding to the satellite and the movable base station.

7. A positioning method suitable for positioning a vehicle, wherein a movable base station and a rover are disposed on the vehicle, and the positioning method comprises:
- receiving a radio data via the movable base station disposed on the vehicle at a first time point, wherein the movable base station is located at a movable base station position at the first time point, and the rover is located at a rover position at the first time point;
- performing a real-time kinematic calculation according to the radio data via the processor when the vehicle is moved at a second time point to obtain the rover position of the second time point;
- obtaining an attitude angle variation of the rover between the first time point and the second time point;
- calculating the movable base station position at the second time point according to the rover position of the second time point and the attitude angle variation;
- positioning the vehicle of the second time point according to the movable base station position and the rover position of the second time point; and
- calculating a carrier phase difference between the movable base station and the rover at the second time point to update the radio data at the second time point.

8. The positioning method of claim 7, further comprising: obtaining an attitude angle variation via an orientation estimator.

9. The positioning method of claim 8, wherein the orientation estimator comprises at least one of the following: a three-axis gyroscope, a three-axis accelerometer, and a three-axis electronic compass.

10. The positioning method of claim 7, wherein the radio data corresponds to at least one of the following: a distance between a satellite and the movable base station, an ionospheric error, a tropospheric error, a carrier frequency, a carrier wavelength, a carrier phase, a number of carriers between the rover and the satellite, an error of a code phase measurement, and an error of a carrier phase measurement.

11. The positioning method of claim 10, wherein the distance between the satellite and the movable base station comprises the code phase measurement and the carrier phase measurement.

12. The positioning method of claim 10, wherein the step of calculating the carrier phase difference between the movable base station and the rover at the second time point to update the radio data of the second time point comprises:
- calculating the carrier phase difference according to a distance between the movable base station and the rover and an elevation angle corresponding to the satellite and the movable base station.

* * * * *